(12) United States Patent
Saheki et al.

(10) Patent No.: US 6,922,141 B2
(45) Date of Patent: Jul. 26, 2005

(54) MOUNTING STRUCTURE OF TRANSMITTER FOR TIRE CONDITION MONITORING APPARATUS

(75) Inventors: Setsuhiro Saheki, Gifu-ken (JP); Yoshitaka Ito, Gifu-ken (JP)

(73) Assignee: Pacific Industrial Co., Ltd., Ogaki (JP)

( * ) Notice: Subject to any disclaimer, the term of this patent is extended or adjusted under 35 U.S.C. 154(b) by 85 days.

(21) Appl. No.: 10/414,526

(22) Filed: Apr. 15, 2003

(65) Prior Publication Data

US 2003/0201883 A1 Oct. 30, 2003

(30) Foreign Application Priority Data

Apr. 26, 2002 (JP) ........................................ 2002-126217

(51) Int. Cl.[7] .............................................. B60C 23/00
(52) U.S. Cl. ..................................... 340/447; 116/34 R
(58) Field of Search ................................ 340/447, 449, 340/451; 116/34 R, 34 A, 34 B; 73/1.44, 1.57, 146.8

(56) References Cited

U.S. PATENT DOCUMENTS 6,549,125 B2    4/2003  Nigon et al.

FOREIGN PATENT DOCUMENTS

EP           03 00 9269          10/2003

*Primary Examiner*—Jeffery Hofsass
*Assistant Examiner*—Jennifer Stone
(74) *Attorney, Agent, or Firm*—Colin P. Cahoon; Chad E. Walter; Carstens & Cahoon LLP (57) ABSTRACT

A transmitter is attached to a wheel of a vehicle and transmits data indicating a condition of a tire of the vehicle. A mounting structure of the transmitter has a casing, a pin and a fastener cap. The casing accommodates the transmitter. The casing has a through hole. The pin is attached to the wheel and inserted into the through hole of the casing. The fastener cap is fastened to the pin such that the casing does not come off the pin.

14 Claims, 5 Drawing Sheets

MOUNTING STRUCTURE OF TRANSMITTER FOR TIRE CONDITION MONITORING APPARATUS

BACKGROUND OF THE INVENTION

The present invention relates to a mounting structure of a transmitter for a tire condition monitoring apparatus, and more particularly, to a mounting structure of a transmitter used in a tire condition monitoring apparatus that wirelessly transmits tire conditions such as a tire air pressure to a receiver.

Wireless tire condition monitoring apparatuses that allow a driver in a vehicle passenger compartment to check the conditions of vehicle tires have been proposed. One such monitoring system includes transmitters and a receiver. Each transmitter is located in the wheel of one of the tires and the receiver is located in the body frame of the vehicle.

Figure 6:
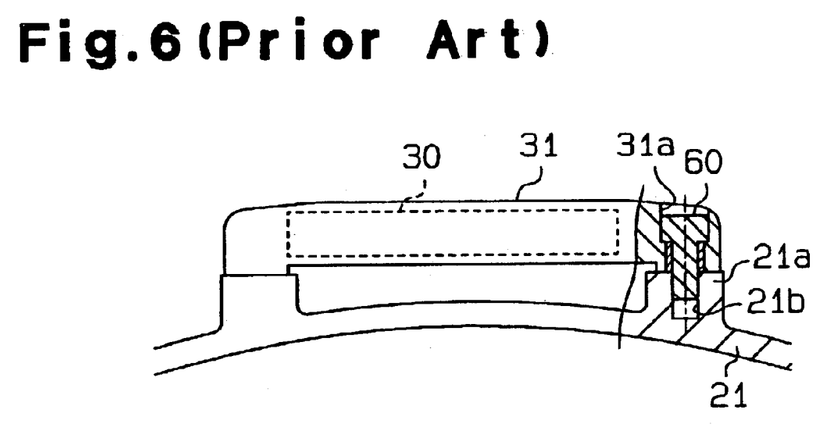
FIG. 6 is a front view, with a part cut away, illustrating a prior art transmitter in a wheel.

FIG. 6 shows an example of such a transmitter 30. The transmitter 30 is accommodated in a rectangular casing 31. A through hole 31a is formed at each end of the casing 31 (only one of the through holes 31a is shown in FIG. 6). Projections 21a for fixing the transmitter 30 to a wheel 21 are integrally formed with the wheel 21 at positions corresponding to the through holes 31a. A recess 21b to which a bolt 60 is threaded is formed in the center of each projection 21a. Each bolt 60 is inserted into the corresponding through hole 31a, and is then threaded to the corresponding recess 21b, which fixes the casing 31 to the wheel 21.

In this structure, each projection 21a, which has the recess 21b, must be integrally formed with the wheel 21. In other words, to install the transmitter 30, the wheel 21 must be specially designed for the transmitter 30. This adds to the costs of the wheels 21. If the wheel 21 is made of thin steel plate, it is difficult to form the projections 21a integrally with the wheel 21. Further, when threading the bolts 60 with the recesses 21b, the tightening torque of the bolts 60 needs to be carefully adjusted, this need complicates the installation.

SUMMARY OF THE INVENTION

Accordingly, it is an objective of the present invention to provide a mounting structure of a transmitter used in a tire condition monitoring apparatus, which structure permits the transmitter to be easily mounted on a wheel.

To achieve the foregoing and other objectives and in accordance with the purpose of the present invention, the invention provides a mounting structure of a transmitter for a tire condition monitoring apparatus. The transmitter is attached to a wheel of a vehicle and transmits data indicating a condition of a tire of the vehicle. The mounting structure has a casing, a pin, and a fastener. The casing accommodates the transmitter. The casing has a through hole. The pin is attached to the wheel. The pin is inserted into the through hole of the casing. The fastener is fastened to the pin such that the casing does not come off the pin.

The present invention also provides another mounting structure of a transmitter for a tire condition monitoring apparatus. The transmitter is attached to a wheel of a vehicle and transmits data indicating a condition of a tire of the vehicle. The mounting structure has a casing, an elastic member, a pin, and a fastener. The casing accommodates the transmitter. The elastic member is attached to the casing. The elastic member has a through hole. The pin is attached to the wheel. The pin is inserted into the through hole of the elastic member. The fastener is fastened to the pin such that the elastic member does not come off the pin.

Other aspects and advantages of the invention will become apparent from the following description, taken in conjunction with the accompanying drawings, illustrating by way of example the principles of the invention.

DESCRIPTION OF THE DRAWINGS

The invention, together with objects and advantages thereof, may best be understood by reference to the following description of the presently preferred embodiments together with the accompanying drawings in which.

DESCRIPTION OF THE PREFERRED EMBODIMENTS

A mounting structure of a tire condition monitoring apparatus 1 according to one embodiment of the present invention will now be described with reference to FIGS. 1 and 2.

Figure 1:
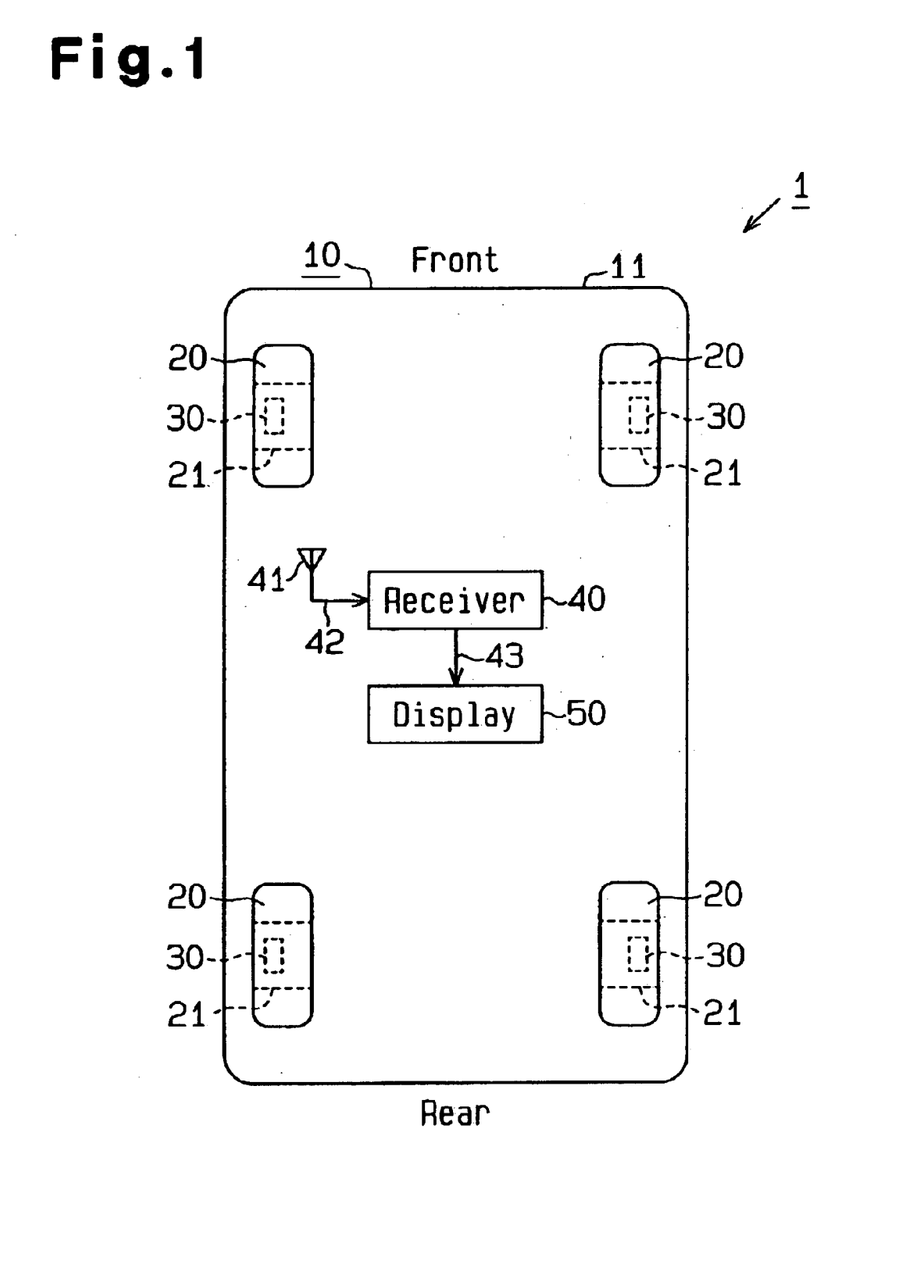
FIG. 1 is a block diagram showing a tire condition monitoring apparatus according to one embodiment of the present invention.

As shown in FIG. 1, the tire condition monitoring apparatus 1 includes four transmitters 30 and a receiver 40. The each transmitter 30 is located in one of the tires 20 of a vehicle 10. The receiver 40 is located on a body frame 11 of the vehicle 10.

Each transmitter 30 is located in the corresponding tire 20 and is fixed to a wheel 21 of the tire 20. Each transmitter 30 measures the condition of the corresponding tire 20, that is, the internal pressure and the internal temperature of the tire 20. The transmitter 30 then wirelessly transmits data containing air pressure data and temperature data to the receiver 40.

The receiver 40 is located at a predetermined position on the body frame 11, and is activated by electricity of a battery (not shown) of the vehicle 10. The receiver 40 is connected to a reception antenna 41 with a cable 42. The cable 42 is preferably a coaxial cable, which is hardly influenced by noise. The receiver 40 receives signals transmitted by the transmitters 30 through the reception antenna 41.

A display 50 is located in the view of the driver of the vehicle 10, for example, in the passenger compartment. The display 50 is connected to the receiver with a cable 43.

Figure 2:
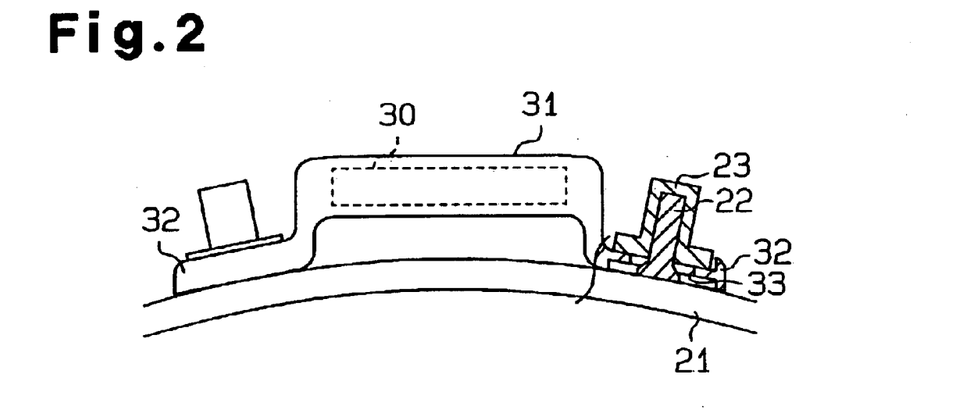
FIG. 2 is a front view, with a part cut away, illustrating a transmitter of the tire condition monitoring apparatus mounted on a wheel.

As shown in FIG. 2, each transmitter 30 is accommodated in a rectangular resin casing 31. An extended portion 32 is formed at each end of the casing 31. A through hole 33 is formed in each extended portion 32 (only one of the through holes 33 is shown in FIG. 2). Pins 22 are arc-welded to the wheel 21 at positions corresponding to the through holes 33. The pins 22 maybe spot-welded to the wheel 21.

Each of the pins 22 is received by the corresponding through hole 33. This engages the casing 31 with the wheel 21. Thereafter, a fastener cap 23 is placed on each pin 22 and then hit, for example, with a hammer. This press fits the fastener cap 23 to the pin 22. Accordingly, the casing 31, which accommodates the transmitter 30, is mounted on the wheel 21.

This embodiment provides the following advantages.

The extended portions 32 are formed at the ends of each casing 31, which accommodates the transmitter 30. Each extended portion 32 has the through hole 33. The pins 22 are fixed to the corresponding wheel 21 at positions corresponding to the through holes 33 of the casing 31. Each of the pins 22 is received by the corresponding through hole 33 of the casing 31. This engages the casing 31 with the wheel 21. Thereafter, a fastener cap 23 is placed on each pin 22 and then hit, for example, with a hammer, which press fits the fastener cap 23 to the pin 22. Accordingly, the casing 31 is mounted on the wheel 21. In this manner, the transmitter 30 is mounted on the wheel 21 with a simple structure.

Since the fastener caps 23 are press fitted to the pins 22, even if the tires 20 are rotated at a high speed while the vehicle 10 is traveling, the casing 31, which accommodates the transmitter 30, does not come off the pins 22 due to external forces, such as centrifugal force. In other words, the transmitters 30 are reliably mounted on the wheels 21.

The pins 22 are arc-welded to the wheel 21. Therefore, unlike the prior art, a dedicated wheel 21 (see FIG. 6) for mounting the transmitter 30 is not needed. Also, since the pins 22 are arc-welded to the wheel 21, the transmitter 30 is firmly mounted on the wheel 21 even if the wheel 21 is made of a thin steel plate.

Unlike the prior art shown in FIG. 6, the transmitter 30 is not mounted on the wheel 21 with bolts 60. Thus, the fastening torque of the bolts 60 does not need to be adjusted. Therefore, when the transmitters 30 are mounted on the wheels 21, the installation is not complicated.

It should be apparent to those skilled in the art that the present invention may be embodied in many other specific forms without departing from the spirit or scope of the invention. Particularly, it should be understood that the invention may be embodied in the following forms.

Figure 3:
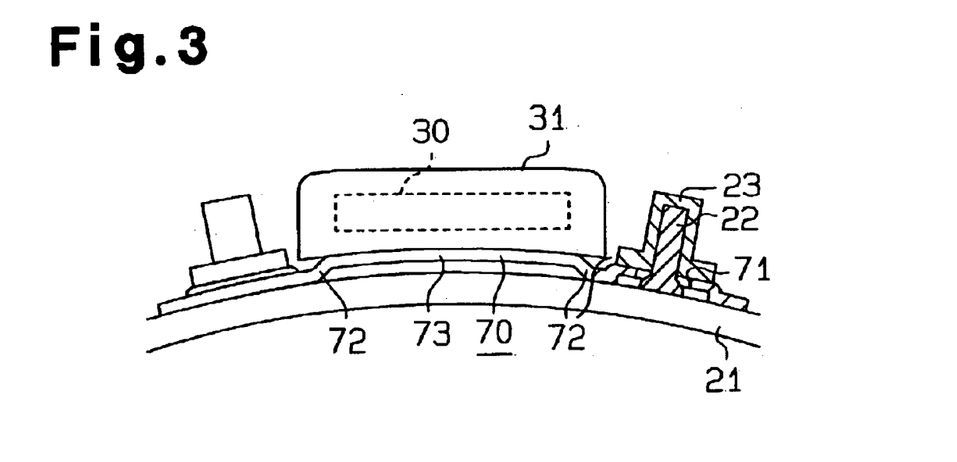
FIG. 3 is a front view, with a part cut away, illustrating a transmitter according to a modified embodiment mounted on a wheel.

FIG. 3 shows a modification in which the resin casing 31, which accommodates the transmitter 30, is fixed to a leaf spring 70 through heat crimping. Specifically, through holes 71 are formed in the leaf spring 70 at positions corresponding to the pins 22 fixed to the wheel 21. The leaf spring 70 has two inclined portions 72, which are inclined toward the center of the casing 31 from the ends, and a substantially flat mount portion 73, which is located between the inclined portions 72. The casing 31 is heat crimped to the mount portion 73. The through holes 71 are engaged with the pins 22 so that the casing 31 is engaged with the wheel 21 through the leaf spring 70. Thereafter, a fastener cap 23 is placed on each pin 22 and then hit, for example, with a hammer, which press fits the fastener cap 23 to the pin 22. Accordingly, the transmitter 30 is mounted on the wheel 21 with the leaf spring 70. Even if a bead of the tire 20 contacts the casing 31 accommodating the transmitter 30 while attaching or detaching the tire 20, force that presses the casing 31 toward the center of the wheel 21 is absorbed by flection of the leaf spring 70. This prevents the casing 31 from being damaged. Accordingly, the electronic parts of the transmitter 30 are prevented from being damaged.

Figure 4A:
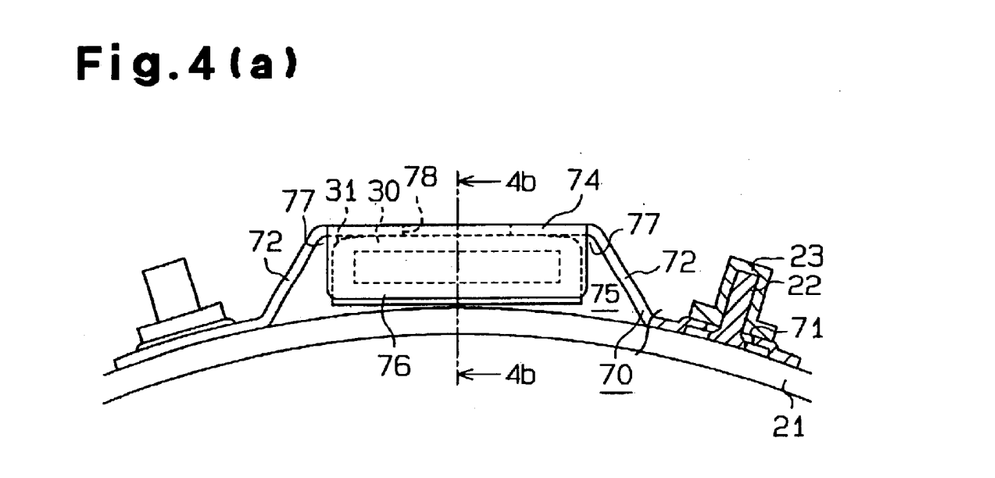
FIG. 4(a) is a front view, with a part cut away, illustrating a transmitter according to a modified embodiment mounted on a wheel.
Figure 4B:
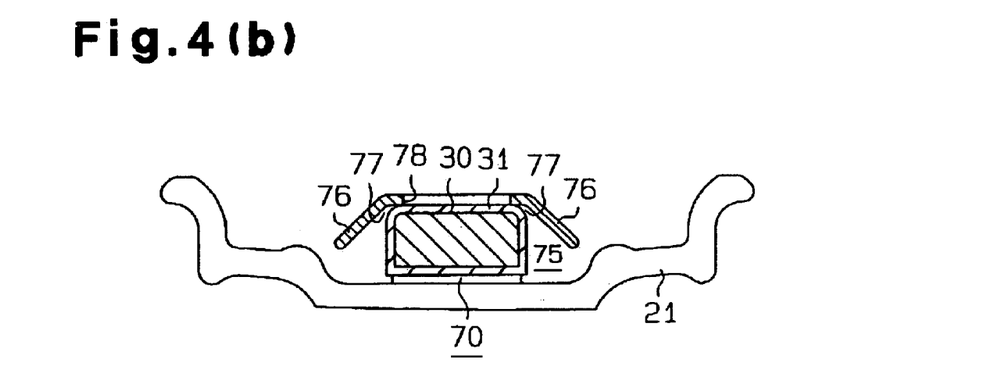
FIG. 4(b) is a cross-sectional view taken along line 4b—4b of FIG. 4(a)

FIGS. 4(a) and 4(b) show another modification. In this modification, a space 75 is defined between a wheel 21 and a substantially flat mount portion 74 of a leaf spring 70 to accommodate a transmitter 30. The leaf spring 70 has first inclined portions 72, which are formed by extending the inclined portions 72 shown in FIG. 3, the substantially flat mount portion 74 connecting the first inclined portions 72, and second inclined portions 76 extending in directions different from the directions in which the first inclined portions 72 extend. The inclined portions 72, 76 extend from the mount portion 74. In the space 75, a clearance 77 exists between each first inclined portion 72 and the corresponding end of the casing 31. A clearance 77 also exists between each second inclined portion 76 and the corresponding end of the casing 31. A window 78 for wireless communication is formed in the mount portion 74. The transmitter 30 wirelessly transmits data regarding the internal pressure and the internal temperature of the tire 20 to the receiver 40. Thus, in consideration of the properties of radio waves used by the transmitter 30, the window 78 is formed in the leaf spring 70.

The casing 31 accommodating the transmitter 30 is attached to the mount portion 74 through heat crimping. The through holes 71 are engaged with the pins 22 to engage the casing 31 to the wheel 21 with the leaf spring 70. Thereafter, a fastener cap 23 is placed on each pin 22 and then hit, for example, with a hammer, which press fits the fastener cap 23 to the pin 22. Accordingly, the transmitter 30 is mounted on the wheel 21 with the leaf spring 70. Even if a bead (not shown) of the tire 20 contacts the leaf spring 70 while attaching or detaching the tire 20, force that presses the casing 31 downward is absorbed by flection of the leaf spring 70. Also, if the bead contacts the inclined portions 72, 76, and the inclined portions 72, 76 are elastically deformed, the clearances 77 permit the inclined portions 72, 76 to be deformed without contacting the casing 31. This prevents the casing 31 from being damaged. Accordingly, the electronic parts of the transmitter 30 are prevented from being damaged. Further, since the window 78 is formed in the mount portion 74, the transmitter 30 wirelessly transmits data in a reliable manner even if the leaf spring 70 is made of metal. As a result, the receiver 40 reliably receives data transmitted by the transmitter 30 through the reception antenna 41.

Figure 5A:
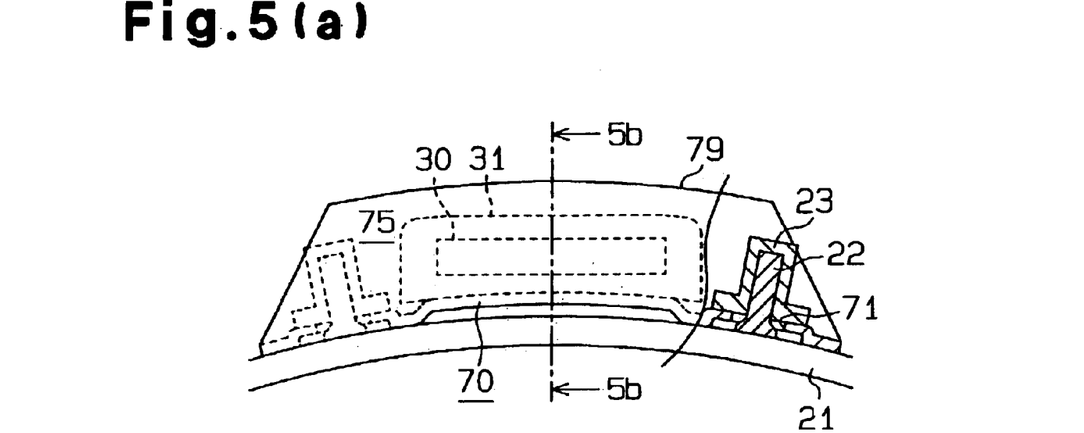
FIG. 5(a) is a front view, with a part cut away, illustrating a transmitter according to another modified embodiment mounted on a wheel.
Figure 5B:
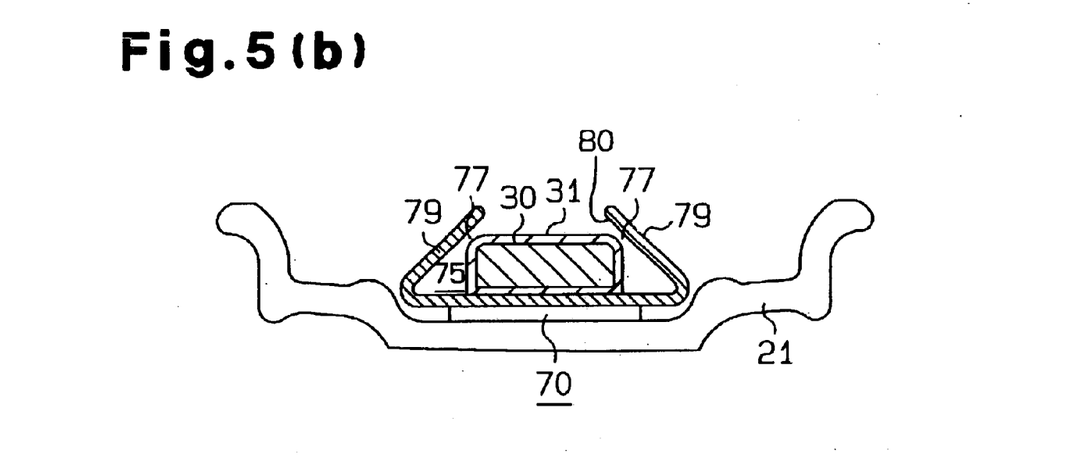
FIG. 5(b) is a cross-sectional view taken along line 5b—5b of FIG. 5(a)

FIGS. 5(a) and 5(b) show another modification. In this modification, a space 75 is defined in the center of a leaf spring 70, and the transmitter 30 is provided in the space 75. As shown in FIG. 5(a), through holes 71 are formed in the leaf spring 70 at positions corresponding to pins 22. Then, the casing 31 is heat crimped to the leaf spring 70 to be located in the space 75. Ends of the leaf spring 70 in a direction perpendicular to the circumferential direction of the wheel 21 are bent toward the casing 31 to form two inclined portions 79 (see FIG. 5(b)). The leaf spring 70 also has an opening 80 at a position corresponding to the upper surface of the transmitter 30. The inclined portions 79 and the casing 31 define clearances 77. As in the above embodiments, the through holes 71 of the leaf spring 70 are engaged with the pins 22. Then, a fastener cap 23 is placed on each pin 22 and hit, for example, with a hammer. This press fits the fastener cap 23 to the pin 22. Accordingly, the transmitter 30 is mounted on the wheel 21 with the leaf spring 70. Like the embodiment of FIGS. 4(a) and 4(b), even if a bead of the tire 20 contacts the leaf spring 70 while attaching or detaching the tire 20, force that presses the casing 31 toward the center of the wheel 21 is absorbed by flection of the leaf spring 70. Even if the inclined portions 79 are elastically deformed, the clearances 77 between the casing 31 and the inclined portions 79 prevent the inclined portions 79 from contacting the casing 31. That is, elastic deformation of the inclined portions 79 is permitted. This prevents the casing 31 from being damaged. Accordingly, the electronic parts of the transmitter 30 are prevented from being damaged.

The above embodiments may be applied to a transmitter with which a tire valve is integrally formed or to a transmitter to which a tire valve is coupled. In this case, the tire valve functions as a transmission antenna of the transmitter, and thus no window like the window 78 in FIGS. 4(a) and 4(b) is required.

When the leaf spring 70 is made of metal, the leaf spring 70 functions as an electromagnetic shield, which prevents the transmitter 30 from being erroneously activated by an external radio waves.

The embodiments of FIGS. 1 to 5(b) may be applied to a transmitter that requires no external power source. This type of transmitter has a coil accommodated in a casing, the coil corresponding to a magnet embedded in the body frame of a vehicle, such as, in a fender. Electricity is generated by the coil and magnet.

The leaf springs 70 of the embodiments 3 to 5(b) may be made of any material as long as the material is elastic.

In the embodiments of FIGS. 3 to 5(b), the leaf springs 70 may be integrally formed with the casing 31.

In the embodiments of FIGS. 3 to 5(b), the transmitter 30 may be accommodated in the casing 31 after insert molding the casing 31 with the leaf spring 70.

In the embodiments of FIGS. 3 to 5(b), the transmitter 30, the leaf spring 70, and the casing 31 may be insert molded.

Other than four-wheeled vehicles, the present invention may be applied to two-wheeled vehicles, such as bicycles and motor cycles, multi-wheeled busses, multi-wheeled towed vehicles, and industrial vehicles, such as forklifts. When the present invention is applied to a towed vehicle, the receiver 40 and the display 50 are provided in the tractor.

Therefore, the present examples and embodiments are to be considered as illustrative and not restrictive and the invention is not to be limited to the details given herein, but may be modified within the scope and equivalence of the appended claims.

What is claimed is:

1. A mounting structure of a transmitter for a tire condition monitoring apparatus, wherein the transmitter is attached to a wheel of a vehicle and transmits data indicating a condition of a tire of the vehicle, the mounting structure comprising:
    a casing for accommodating the transmitter;
    an elastic member attached to the casing, wherein the elastic member supports the casing such that the casing is spaced from the wheel, wherein the elastic member has a through hole;
    a pin attached to the wheel, wherein the pin is inserted into the though hole of the elastic member; and
    a fastener fastened to the pin such that the elastic member does not come off the pin.

2. The mounting structure according to claim 1, wherein the pin is welded to the wheel.

3. The mounting structure according to claim 1, wherein the elastic member is a leaf spring.

4. The mounting structure according to claim 1, wherein the fastener is a cap, and wherein the pin is press fitted into the cap.

5. The mounting structure according to claim 1, wherein the casing is covered with the elastic member.

6. The mounting structure according to claim 1, wherein the elastic member has a mount portion and a plurality of inclined portions, wherein the transmitter is attached to the mount portion, and the inclined portions incline relative to the mount portion, wherein each inclined portion extends from the mount portion toward the wheel such that a space is defined between the mount portion and the wheel, the space permitting the elastic member to be deformed.

7. The mounting structure according to claim 6, wherein the casing is attached to a part of the mount portion that is opposite from the space.

8. The mounting structure according to claim 6, wherein the mount portion has an opening.

9. A mounting structure of a transmitter for a tire condition monitoring apparatus, wherein the transmitter is attached to a wheel of a vehicle and transmits data indicating a condition of a tire of the vehicle, the mounting structure comprising:
    a casing for accommodating the transmitter;
    a leaf spring attached to the casing, wherein a space exists between the leaf spring and the wheel, the space permitting the casing to be displaced relative to the wheel, and wherein the leaf spring has a through hole;
    a pin attached to the wheel, wherein the pin is inserted into the through hole of the leaf spring; and
    a fastener fastened to the pin such that the leaf spring does no come of the pin.

10. A mounting structure of a transmitter for a tire condition monitoring apparatus, wherein the transmitter is attached to a wheel of a vehicle and transmits data indicating a condition of a tire of the vehicle, the mounting structure comprising:
    a casing for accommodating the transmitter;
    an elastic member attached to the casing, wherein the elastic member has a through hole;
    a pin attached to the wheel, wherein the pin is inserted into the through hole of the elastic member; and
    a fastener fastened to the pin such that the elastic member does not come off the pin,
    wherein the elastic member has a mount portion and a plurality of inclined portions, wherein the transmitter is attached to the mount portion, and the inclined portions inclined relative to the mount portion, wherein each incline portion extends from the mount portion toward the wheel such that a space is defined between the mount portion and the wheel, the space permitting the elastic member to be deformed,
    wherein the casing is located in the space such that the casing is covered by the mount portion and the inclined portions.

11. The mounting structure according to claim 10, wherein a clearance exists between the casing and inclined portions.

12. A mounting structure of a transmitter for a tire condition monitoring apparatus, wherein the transmitter is attached to a wheel of a vehicle and transmits data indicating a condition of a tire of the vehicle, the mounting structure comprising:
    a casing for accommodating the transmitter;
    an elastic member attached to the casing, wherein the elastic member has a through hole;

a pin attached to the wheel, wherein the pin is inserted into the through hole of the elastic member; and a fastener fastened to the pin such that the elastic member does not come off the pin, wherein the elastic member comprises:

a mount portion, wherein the transmitter is attached to the mount portion;

a first inclined portion inclined relative to the mount portion, wherein the first incline portion extends from the mount portion toward the wheel such that a space is defined between the mount portion and the wheel, the space permitting the elastic member to be deformed, wherein the casing is attached to a part of the mount portion that is opposite from the space; and a second inclined portion incline relative to the mount portion, the second inclined portion extending from the mount portion to a direction away from the wheel, and wherein the second inclined portion covers the casing.

13. The mounting structure according to claim 12, wherein the second inclined portion is one of a plurality of second inclined portions, wherein the second inclined portions extend from the opposite ends of the mount portion to approach each other, and wherein distal ends of the second inclined portions are spaced from each other.

14. The mounting structure according to claim 12, wherein a clearance is defined between the casing and the second inclined portion.

* * * * *

UNITED STATES PATENT AND TRADEMARK OFFICE
CERTIFICATE OF CORRECTION

PATENT NO.     : 6,922,141 B2
DATED          : July 26, 2005
INVENTOR(S)    : Setsuhiro Saheki and Yoshitaka Ito It is certified that error appears in the above-identified patent and that said Letters Patent is hereby corrected as shown below:

Column 5,
Line 61, replace the word "though" with -- through --.

Column 6,
Line 32, replace the word "of" with -- off --.
Line 48, replace the word "inclined" with -- incline --.
Line 49, replace the word "incline" with -- inclined --.

Column 7,
Line 8, replace the phrase "inclined relative to" with -- incline relative to --.
Line 9, replace the word "incline" with -- inclined --.

Signed and Sealed this

Thirteenth Day of September, 2005

JON W. DUDAS
*Director of the United States Patent and Trademark Office*